UNITED STATES PATENT OFFICE.

HAROLD ROBERT RAFSKY, OF PORTLAND, MAINE.

COATED PAPER.

1,260,448. Specification of Letters Patent. Patented Mar. 26, 1918.

No Drawing. Application filed December 11, 1915, Serial No. 66,348. Renewed August 13, 1917. Serial No. 186,053.

*To all whom it may concern:*

Be it known that I, HAROLD R. RAFSKY, a citizen of the United States, residing at Portland, in the county of Cumberland and State of Maine, have invented certain new and useful Improvements in Coated Paper, of which the following is a specification.

My process relates to an improved paper.

As is well known, in the production of "art" or "coated" paper, a somewhat concentrated watery suspension of clay, satin white, blanc fixe, ordinary calcium carbonate, or the like, to which has been added an appropriate adhesive, is applied to the surface or surfaces of a paper "body stock."

In the manufacture of wood pulp by the soda process, wood is digested with a solution of caustic soda under a suitable pressure. The resulting pulp is then separated from the spent liquor, which is termed "black liquor." This "black liquor" is usually evaporated and burned, thus producing "black ash," which is essentially a mixture of carbon and sodium carbonate, the latter being produced from the sodium salts in the "black liquor." The "black ash" is leached with water, the sodium carbonate being obtained in the resulting solution. Or, instead, the carbon of the "black ash" may be more or less completely burned away, leaving the sodium carbonate as the residue. The sodium carbonate referred to in either of the two previous sentences is termed "reclaimed soda."

To produce the caustic soda necessary for wood digestion, a solution of this "reclaimed soda" is causticized with lime, (*i. e.* calcium oxid). The ordinary "soda ash" (*i. e.* sodium carbonate) of commerce may supplement the "reclaimed soda," or replace it wholly or in part, in the causticizing process. As a result of the causticizing process, there is produced, in addition to the caustic soda, a precipitate consisting essentially of calcium carbonate and commonly called "lime mud." The greater part of the caustic soda solution is separated from the "lime mud" by well known means, and after washing the residual caustic soda out of the "lime mud" as far as it is economically practicable, this "lime mud" is thrown away, being generally considered as a waste product and a nuisance.

I am fully aware that repeated attempts have been made to utilize this "lime mud" for reburning to lime (*i. e.* CaO), for agricultural purposes, for an ingredient of cement, and the like, but the use to which I wish to put the "lime mud" is wholly different.

Notwithstanding the fact that it was heretofore the belief in the art of making paper that "lime mud" could not be used in the manufacture of "art" or "coated" papers by coating the paper "body stock," I conducted repeated experiments with "lime mud" and found that, besides being useful as a material for coating paper, it possessed certain advantages not heretofore known and which are absent in ordinary calcium carbonate.

It is difficult to moisten thoroughly ordinary calcium carbonate with the complete exclusion of air bubbles, and to produce with that material a perfectly smooth homogeneous lump-free mixture so essential for the formation of a proper surface on "coated" paper. "Lime mud," on the contrary, is a thoroughly wet mass, which mixes with water with extreme ease to a perfectly homogeneous bubble-free suspension. The "lime mud" ordinarily contains an appreciable quantity of alkali, usually considered to consist chiefly of calcium hydroxid, sodium carbonate, and sodium hydroxid. This alkali is not detrimental to the use of the "lime mud," but rather beneficial, because the adhesive, such for example as casein, which is dissolved by alkali before adding it to the coating mixture, will thus require a little less alkali to be added to it.

In the practice of my process, a solution of sodium carbonate (soda ash of commerce) or of "reclaimed soda" (preferably suitably purified), or a mixture of both, is causticized with lime (*i. e.* CaO). The "lime mud" produced is separated from the sodium hydroxid by well known means, and is then freed from grit and lumps by a sieve or series of sieves or by other known means. The "lime mud" may or may not be washed with water either before or after the sieving, as desired.

As the "lime mud" is more conveniently used when in a concentrated form, this condition may be secured by settling or other appropriate means.

This "lime mud" after sieving and settling, as indicated above, is preferably subjected to a prolonged grinding action in a pebble mill. The "lime mud" in its original unground condition, when viewed under a microscope in such a manner that the ultimate particles are discernible, (i. e. when the "lime mud" is highly diluted with water and held between two glass microscope slides), is seen to consist of more or less irregularly shaped particles or crystals or masses of crystals of widely differing sizes. The grinding above referred to is continued until practically all of the ultimate particles of the "lime mud," when observed microscopically in the same manner as above, are seen to have been reduced to an essentially uniformly minute state of subdivision.

With the addition of a suitable adhesive, such as casein dissolved in an alkaline solution, the essentially uniformly finely divided "lime mud" is now ready for use directly for coating paper "body stock" employing the machines generally used for this purpose; or there may be admixed with the "lime mud" and adhesive mixture other organic material or materials, adhesive or otherwise, or inorganic material or materials, or a combination of both classes of substances, such as may be used in the manufacture of "coated" paper, and the entire mixture used to coat paper "body stock" employing the machines generally used for the production of "art" or "coated" paper. The "coated" paper produced may be calendered or otherwise finished as desired.

The grinding of the "lime mud" to an essentially uniformly minute state of subdivision produces highly beneficial results in the coated paper, to wit, the prevention of: dusting or breaking off of particles of the coating material from the surface of the paper, porous and eruptive appearance of the surface of the paper when viewed under a microscope; high ink consumption, and grayness or "mealiness" in printing results; which are defects found to ordinarily exist in the coated paper, when the "lime mud" is used without being ground. These defects, although detrimental to the production of a paper for the very highest grade of printing, did not prevent the paper made from unground "lime mud" from being satisfactorily used for a less exacting grade of work, and I was first of the opinion that these defects were due to ineradicable characteristics of "lime mud": but after long and careful research and experiments I discovered that this porous character of the surface of the paper coated with the unground "lime mud" was due solely to the physical form of the ultimate particles of the unground "lime mud." I then proceeded to grind the "lime mud," after sieving and settling, prior to its application to the paper "body stock." I found that by coating the paper "body stock" with the finely divided "lime mud," the disadvantages herein above stated were completely overcome.

The disadvantages in the use of unground "lime mud" for coating paper are believed to be due to the more or less coarse grain and irregularity of the size and shape of the ultimate particles of the unground "lime mud."

When this unground "lime mud" is coated upon the paper "body stock," it does not give an even surface, but a surface containing microscopic pores and holes. This causes not only dusting by the breaking off of the irregular particles, but also a greater consumption of ink because of the porous surface, and an inferior printing effect. The ground "lime mud," on the other hand, spreads and lies evenly and uniformly upon the paper "body stock," because of the essentially uniform minuteness and relatively regular shape of its particles, thereby causing the surface to be practically free from pores, and as a consequence, eliminating the undesirable qualities mentioned above.

It is to be understood that the reduction of the particles of the unground "lime mud" to an essentially uniformly minute state of subdivision by grinding takes place gradually, and that paper coated with "lime mud" which has been subjected to a given period of grinding will be somewhat superior to a paper coated with "lime mud" subjected to grinding for a lesser period of time, other conditions being the same; but I have found that the best paper is produced from "lime mud" ground long enough to give the microscopic appearance described above.

Also the operation of sieving the unground "lime mud" might be omitted without seriously affecting the results, when the "lime mud" is subsequently ground; nevertheless this sieving is beneficial in that it removes the very large particles or grit and thus reduces the amount of work which the pebble mill must perform.

Likewise the "lime mud" (i. e., calcium carbonate—$CaCO_3$) produced in other industries by the causticizing of sodium carbonate with lime (i. e., calcium oxid), may be substituted for the "lime mud" produced in soda pulp mills.

When "lime mud" is the only mineral constituent employed in the mixture for coating paper "body stock," the result is a dull or semi-dull finished "coated" paper, according to the amount of calendering which this paper receives. It is to be understood, therefore, that "lime mud" does not give the same type of surface as does satin white, and it is not to be considered as a substitute for that material.

Where the word "lime" is mentioned in the above specification, it is understood to mean only such limes as consist practically wholly of calcium oxid, and which contain only such small quantities of other materials as are considered unimportant from a commercial standpoint.

Where the expression "lime mud" is used in this specification, it is to be considered to mean the ordinary precipitate obtained in the manufacture of caustic soda (NaOH) from lime (CaO) and soda ash ($Na_2CO_3$) by the well known procedure now commonly employed, the chemical composition of this precipitate being calcium carbonate ($CaCO_3$).

It is understood that the form of my invention herewith shown and described is to be taken as a preferred example thereof, and that various changes may be resorted to in the practice of the invention without departing from the spirit of the invention, or the scope of the subjoined claims.

Having thus described my invention, I claim:

1. A paper comprising a paper "body stock" having its surface coated with "lime mud" containing a small amount of alkali and an adhesive soluble in such alkali.

2. A paper comprising a paper "body stock" having its surface coated with "lime mud" containing a small amount of alkali and casein soluble in such alkali.

3. A paper comprising a paper "body stock" having its surface coated with "lime mud" reduced to an essentially uniformly minute state of subdivision and containing a small amount of alkali and an adhesive soluble in such alkali.

4. A paper comprising a paper "body stock" having its surface coated with "lime mud" reduced to an essentially uniformly minute state of subdivision, and an adhesive.

5. A paper comprising a paper "body stock" having its surface coated with "lime mud" reduced by grinding, and an adhesive.

In testimony whereof I affix my signature in presence of two witnesses.

HAROLD ROBERT RAFSKY.

Witnesses:
 JOHN A. DOHERTY,
 JACOB SCHICHE.